United States Patent [19]

Koh

[11] Patent Number: 5,464,979
[45] Date of Patent: Nov. 7, 1995

[54] SURROUND VIEW DETECTOR FOCAL PLANE

[75] Inventor: Wei H. Koh, Irvine, Calif.

[73] Assignee: Grumman Aerospace Corporation, Bethpage, N.Y.

[21] Appl. No.: 254,134

[22] Filed: Jun. 6, 1994

[51] Int. Cl.⁶ .................................................. G01S 5/16
[52] U.S. Cl. ............................................ 250/332; 250/342
[58] Field of Search ..................................... 250/332, 334, 250/342, 338.1, 203.6

[56] References Cited

U.S. PATENT DOCUMENTS

| | | | |
|---|---|---|---|
| 4,225,786 | 9/1980 | Perlman | 250/342 |
| 4,442,359 | 4/1984 | Lederer | 250/342 |

*Primary Examiner*—Davis L. Willis
*Assistant Examiner*—Richard Hanig
*Attorney, Agent, or Firm*—Stetina Brunda & Buyan

[57] ABSTRACT

A multi-directional infrared detector system provides multi-view or surround-view imaging which is particularly suited for use in tactical battlefield situations. The system utilizes a plurality of infrared detector arrays disposed in a generally circular configuration, each of the infrared detector arrays having a plurality of infrared detector elements formed thereon; a corresponding plurality of dedicated optics assemblies for forming images upon the infrared detector arrays; and at least one conductive conduit supporting layer having conductive conduits formed thereon. The conductive conduit support layer extends inwardly from each of the infrared detector arrays to a core defined by the infrared detector arrays. Signal conditioning circuitry is disposed generally at the core of the infrared detector arrays such that signals representative of the outputs of the infrared detector elements are communicated from the detector elements to the signal processing circuitry via the conductive conduits.

21 Claims, 3 Drawing Sheets

SURROUND VIEW DETECTOR FOCAL PLANE

FIELD OF THE INVENTION

The present invention relates generally to infrared detection systems and more particularly to a surround view detector focal plane wherein a plurality of infrared detector arrays are disposed in a generally circular configuration and at least one conductive conduit supporting layer extends inward from each of the infrared detector arrays so as to communicate signals generated by infrared detector elements to signal processing circuitry disposed generally intermediate the infrared detector arrays.

BACKGROUND OF THE INVENTION

The infrared spectrum covers a range of wavelengths longer than the visible wavelengths but shorter than microwave wavelengths. Visible wavelengths are generally regarded as between 0.4 and 0.75 micrometers. The near infrared wavelengths extend from 0.75 micrometers to 10 micrometers. The far infrared wavelengths cover the range from approximately 10 micrometers to 1 millimeter. The function of infrared detectors is to respond to energy of a wavelength within some particular portion of the infrared region.

Heated objects will dissipate thermal energy having characteristic wavelengths within the infrared spectrum. Different levels of thermal energy, corresponding to different sources of heat, are characterized by the emission of signals within different portions of the infrared frequency spectrum. No single detector is uniformly efficient over the entire infrared frequency spectrum. Thus, detectors are selected in accordance with their sensitivity in the range of interest to the designer. Similarly, electronic circuitry that receives and processes the signals from the infrared detector must also be selected in view of the intended detection function.

A variety of different types of infrared detectors have been proposed in the art since the first crude infrared detector was constructed in the early 1800's. Virtually all contemporary infrared detectors are solid state devices constructed of materials that respond to infrared frequency energy in one of several ways. Thermal detectors respond to infrared frequency energy by absorbing that energy causing an increase in temperature of the detecting material. The increased temperature in turn causes some other property of the material, such as resistivity, to change. By measuring this change the infrared radiation is measured.

Photo-type detectors (e.g., photoconductive and photovoltaic detectors) absorb the infrared frequency energy directly into the electronic structure of the material, inducing an electronic transition which, in turn, leads to either a change in the electrical conductivity (photoconductors) or to the generation of an output voltage across the terminals of the detector (photovoltaic detectors). The precise change that is effected is a function of various factors including the particular detector material selected, the doping density of that material and the detector area.

By the late 1800's, infrared detectors had been developed that could detect the heat from an animal at one quarter of a mile. The introduction of a focusing lens constructed of materials transparent to infrared frequency energy, as well as advances in semiconductor materials and highly sensitive electronic circuitry have advanced the performance of contemporary infrared detectors close to the ideal photon limit.

Current infrared detection systems incorporate arrays of large numbers of discrete, highly sensitive detector elements, the outputs of which are connected to sophisticated processing circuitry. By rapidly analyzing the pattern and sequence of detector element excitations, the processing circuitry can identify and monitor sources of infrared radiation. Though the theoretical performance of such systems is satisfactory for many applications, it is difficult to actually construct structures that mate a million or more detector elements and associated circuitry in a reliable and practical manner. Consequently, practical applications for contemporary infrared detection systems have necessitated that further advances be made in areas such as miniaturization of the detector array and accompanying circuitry, minimization of noise intermixed with the electrical signal generated by the detector elements, and the reliability and economical production of the detector array and accompanying circuitry.

A contemporary subarray of detectors may, for example, contain 256 detectors on a side, or a total off 65,536 detectors, the size of each square detector being approximately 0.0035 inches on a side with 0.0005 inches spacing between detectors. The total width of such a subarray would therefore be 1.024 inches on a side. Thus, interconnection of such a subarray to processing circuitry requires a connective module with sufficient circuitry to connect each of the 65,536 detectors to processing circuitry within a square a little more than one inch on a side. The subarrays may, in turn, be joined to form an array that includes 25 million detectors or more. Considerable difficulties are presented in aligning the detector elements with conductors on the connecting module and in isolating adjacent conductors in such a dense environment.

The outputs of the detectors must undergo a series of processing steps in order to permit derivation of the desired information. The more fundamental processing steps include preamplification, tuned bandpass filtering, clutter and background rejection, multiplexing and fixed noise pattern suppression. By providing a detector connecting module that performs at least a portion of the signal processing functions within the module, i.e. on integrated circuit chips disposed adjacent the detector focal plane, the signal from each detector need be transmitted only a short distance before processing. As a consequence of such on-focal plane or "up front" signal processing, reductions in size, power and cost of the main processor may be achieved. Moreover, up front signal processing helps alleviate performance, reliability and economic problems associated with the construction of millions of closely spaced conductors connecting each detector element to the main signal processing network.

A problem commonly associated with contemporary infrared focal planes is their inability to image in more than a single direction. Attempts to overcome this limitation include installing such contemporary focal plane assemblies upon gimbled mounts so as to facilitate movement thereof and thereby increase the view window of the focal plane assembly. Alternatively, a rotating or otherwise moveable mirror may be utilized to reflect images from various different directions onto a stationary contemporary focal plane array.

However, such attempts to utilize contemporary focal plane arrays in applications requiring imaging in more than a single direction are limited in that while the focal plane array is viewing an image in a given direction, images from all other directions are ignored. Thus, very fast infrared targets may not be imaged as soon as desired. For example, an artillery projectile may travel a considerable distance before imaging thereof occurs, and thus may not be imaged until it is too late to provide a countermeasure therefore.

Additionally, the use of such gimbled or otherwise pivotally mounted focal plane arrays and/or moveable mirror assemblies requires intricate mechanical linkages and precise alignments, as well as sophisticated control circuitry therefor. As such, the use of such contemporary multi-view infrared focal plane arrays has been ineffective in providing a satisfactory means for providing multi-view imaging.

SUMMARY OF THE INVENTION

The present invention specifically addresses and alleviates the above-mentioned deficiencies associated with the prior art. More particularly, the present invention comprises an multi-directional infrared detector system for providing multi-view or surround-view, particularly for use in tactical battlefield situations. The system comprises a plurality of infrared detector arrays disposed in a generally circular configuration, each of the infrared detector arrays having a plurality of infrared detector elements formed thereon; a corresponding plurality of optics assemblies, e.g., filters, lenses, etc., for forming images upon the infrared detector arrays; and at least one conduit support layer having conductive conduits formed thereon. The conductive conduit supporting layers extend inwardly from each of the infrared detector arrays, preferably so as to define wedge-shaped modules. Signal conditioning circuitry is disposed generally at the core of the infrared detector arrays such that signals representative of the outputs of the infrared detector elements are communicated from the detector elements to the signal processing circuitry via the conductive conduits.

A thermally conductive encapsulant is preferably applied over the conduit support layers so as to isolate the wedge-shape modules from one another. The thermally conductive encapsulant material facilitates interconnection of adjacent wedge-shape modules, much the same as such thermally conductive encapsulant material does during stacking of contemporary focal plane arrays. The thermally conductive encapsulant material preferably comprises a liquid polymer encapsulant and is applied to the stairstep-like edges of the conduit support layers so as to form smooth surfaces from the stairsteps. The thermally conductive encapsulant material does not cover the longest conduit support layers, which have electrical contact pads formed thereon for interconnection of the wedge-shaped module to signal conditioning circuitry, preferably disposed generally along the center of the multi-directional infrared detector system of the present invention.

An interconnect/cooling rod preferably has the outside thereof wrapped with multilayer flex cable having exposed electrical contact bumps formed thereon for providing electrical interconnection with the wedge-shaped modules. The inner space or tubular bore of the interconnect/cooling rod optionally contains a cooling liquid, depending upon the type of infrared detector utilized. High temperature infrared detectors, if used, such as InSb detectors typically do not require such cooling. The contact bumps of the interconnect/cooling rod are preferably supported by a spring-loaded backing so as to assure proper contact pressure with the corresponding electrical contact bumps formed upon the longest conduit support layers of each wedge-shaped module.

A covering or dome preferably surrounds the octagonal assembly of focal plane arrays and optical filters. Each filter may optionally be sealed or glued to the covering along each side of the filter. Alternatively, the filters may be bonded or otherwise attached to each focal plane array itself. Filters of various different spectral ranges may be utilized so as to provide multi-color detection. For example, the filters along the first, third, fifth and seventh focal plane arrays may be medium wavelength filters, while the filters adjacent the second, fourth, sixth, and eighth focal plane arrays may optionally be long wavelength.

The infrared detector module may be formed of various different alternative configurations. For example, those skilled in the art will recognize that the infrared detector arrays may be disposed in an octagonal, hexagonal, pentagonal, square, or triangular configuration. Thus, those skilled in the art will recognize that various numbers of infrared detector arrays may be utilized.

The conductive conduit support layers extend, preferably generally perpendicularly, from each of the infrared detector arrays generally toward the center or core thereof.

Thus, the infrared detector module of the present invention may be utilized in tactical battlefield situations to detect various thermal images, and to potentially initiate countermeasures in response to such imaging.

For example, the infrared detector module of the present invention may be mounted in a stationary fashion within a battlefield so as to provide an indication of incoming artillery fire, missiles, troop movement, vehicular movement, etc.

As a further example, the infrared detector module of the present invention may be mounted upon a tank or other mobile platform so as to provide an indication of the presence and movements of various thermal targets.

As a further example, the infrared detector module of the present invention may be mounted upon with various airborne or space born platforms so as to provide an of the presence and movements of various thermal targets.

Use of the infrared detector module of the present invention eliminates the need to move either the focal plane or optics, e.g., mirrors, associated therewith in an attempt to obtain multi-view imaging.

Complete surround viewing may be obtained by insuring that the field of view for each focal plane of the infrared detector modules of the present invention overlaps sufficiently to assure that no non-imaging or dead spots occur within the desired imaging field. Thus, a single infrared detector module of the present invention may be utilized to view in all horizontal directions simultaneously, i.e., to provide 360 degree viewing.

Two examples of infrared detection systems are provided in U.S. Pat. No. 4,703,170 issued to SCHMITZ on Oct. 27, 1987 and entitled INFRARED FOCAL PLANE MODULE and U.S. Pat. No. 5,093,708 issued to SOLOMON on Mar. 3, 1992 and entitled MULTI-LAYER INTEGRATED CIRCUIT MODULE, the contents of both of which are hereby incorporated by reference.

These, as well as other advantages of the present invention will be more apparent from the following description and drawings. It is understood that changes in the specific structure Shown and described may be made within the scope of the claims without departing from the spirit of the invention.

DETAILED DESCRIPTION OF THE PREFERRED EMBODIMENT

The detailed description set forth below in connection with the appended drawing is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

Figure 1:
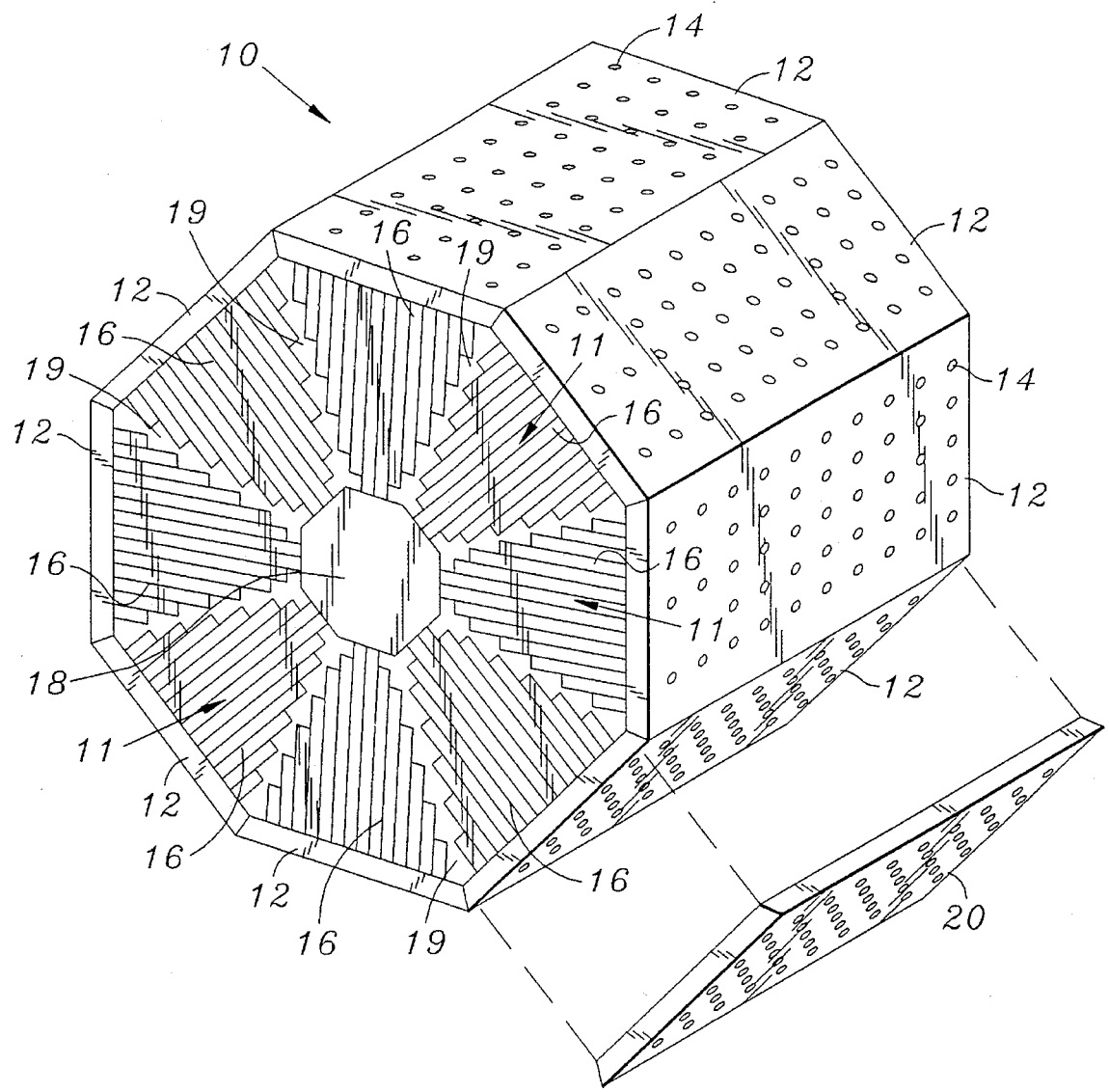
FIG. 1 is a perspective view of the infrared detector module of the present invention showing a plurality of wedge-shaped modules having infrared detector arrays or focal plane assemblies formed thereon and octagonally configured such that the conduit support layers thereof extend inwardly toward a common core.

The surround view detector focal plane of the present invention is illustrated in FIGS. 1 through 5 which depict a presently preferred embodiment of the invention. Referring now to FIG. 1, the infrared detector module of the present invention generally comprises a plurality of infrared detector arrays 12 disposed in a generally circular configuration, each of the infrared detector arrays 12 having a plurality of individual infrared detector elements 14 formed thereon. At least one, preferably a plurality, of conductive conduit support layers 16 extend inwardly, preferably perpendicularly, from each of the infrared detector arrays 12 so as to form wedge-shaped modules 11. Adjacent wedge-shaped modules 11 are preferably isolated from one another via a thermally conductive encapsulant material 19, preferably a liquid polymer encapsulant, formed upon the stairstep edges of the laminarly stacked conduit support layers 16. Thus, the thermally conductive encapsulant material both isolates adjacent wedge/shaped modules 11 and also bonds the wedge-shaped modules 11 together so as to define the octagonal surround view detector focal plane. Signals representative of outputs of the infrared detector elements 14 are communicated via conductive conduits formed upon the conductive conduit supporting layers 16 from the infrared detector elements 14 to signal processing circuitry or optionally to a connector/cooling rod 18 disposed at the center or core of the infrared detector arrays.

The conductive conduit support layer 16 may optionally additionally comprise circuitry, preferably signal processing circuitry such as filters, pre-amplifiers, multiplexers, etc. Alternatively, the conductive conduit support layer 16 may merely provide electrical interconnection from the infrared detector elements 14 to signal processing circuitry 18 disposed at the core of the infrared detector arrays.

A dedicated optics assembly 20 is associated with each infrared detector array 12 and contains the optical components necessary to image infrared sources upon infrared detector array 12. Those skilled in the art will recognize that various configurations of optical components are suitable for such imaging.

Figure 2:
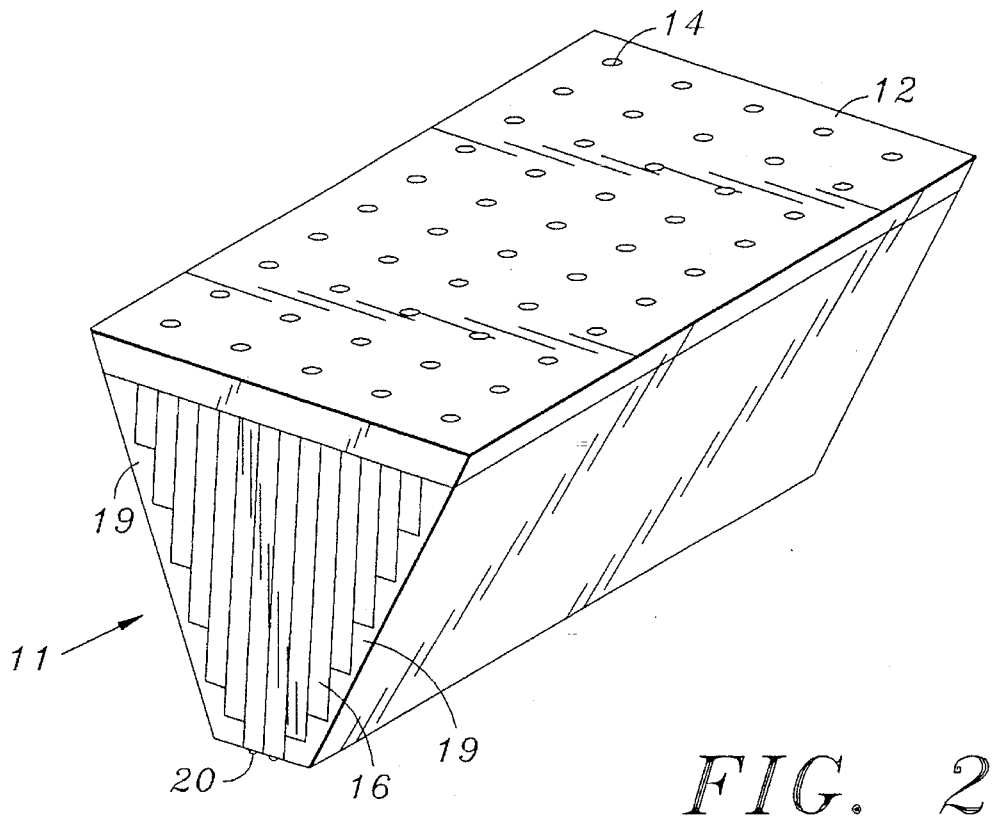
FIG. 2 is a perspective view of a single wedge-shaped module of FIG. 1.

Referring now to FIG. 2, each individual wedge-shaped module 11 comprises a detector array 12 having a plurality of detector elements 14 formed upon the outer surface thereof, a plurality of substrates, i.e. conduit support layers 16, containing conductive conduits and encapsulant material 19 formed over the ends of the conduit support layers. The encapsulant material 19 substantially covers the inboard surfaces of the conduit support layers 16, with the exception that the inboard surfaces of the two longest conduit support layers are not so covered. The inboard surfaces of the two longest conduit support layers 16 have electrical contact pads or bumps 20 formed thereon so as to facilitate electrical interconnection with the signal conditioning circuitry 18.

Figure 3:
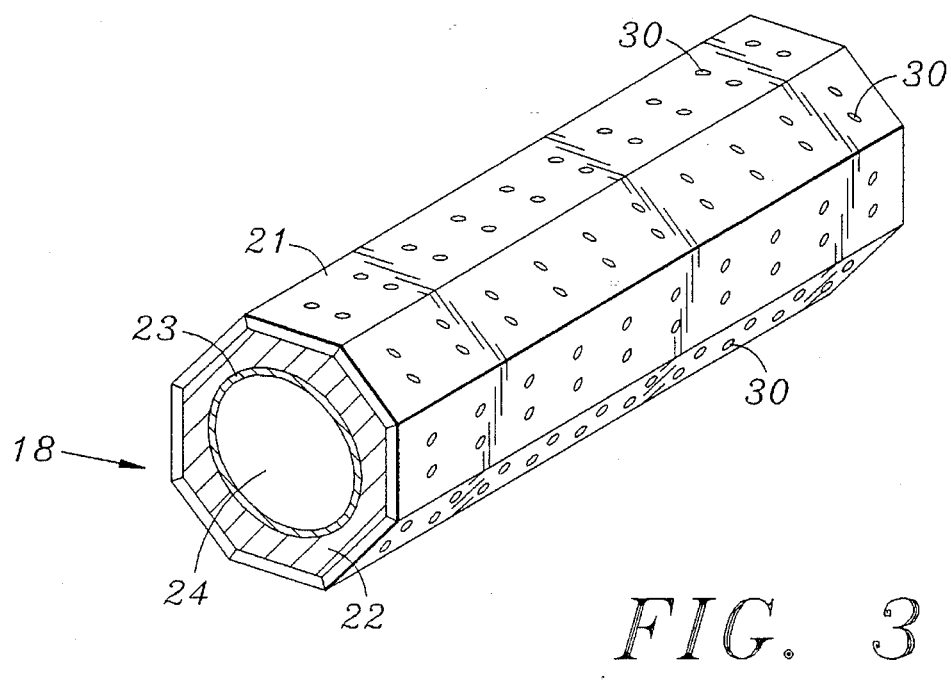
FIG. 3 is a perspective view of a optional connector/cooling rod for providing electrical interconnection between the wedge-shaped modules and signal conditioning circuitry and also for provides cooling to those infrared detectors requiring thermal regulation.

Referring now to FIG. 3, the signal conditioning electronics may optionally be replaced with a connector/cooling rod 18 which is disposed along the central axis of the surround view detector focal plane and which provides for both cooling of the focal plane and electrical interconnection between the focal plane and signal conditioning electronics located elsewhere. The connector/cooling rod comprises metal, e.g., gold-plated, contact pads or bumps 10 formed about the outer surface thereof which provide electrical interconnection by abutting the corresponding contact bumps 30 formed upon the two longest conduit support layers 16 of each wedge-shaped module. The contact bumps 30 are formed upon a multilayered flex-cable connector 21. A spring-loaded/compliant support 22 is preferably utilized so as to maintain effective and reliable contact between the contact bumps 30 formed upon the multilayered flex-cable connector 21 and the contact bumps 30 formed upon the wedge-shaped modules 11.

A metal rod or pipe preferably extends along the central axis of the connector/cooling rod 18 so as to provide for the flow of cooling fluid therethrough. The cooling fluid flows through a bore 24 so as to provide for cooling of the focal plane array, particularly wherein infrared detectors requiring such heat dissipation are utilized.

Figure 4:
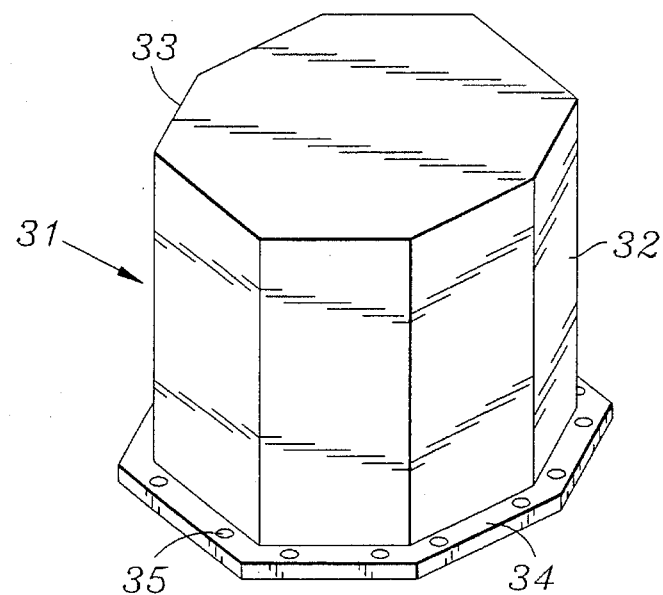
FIG. 4 is a perspective view of the optical filter and enclosure assembly of the present invention.

Referring now to FIG. 4, an optical filter/enclosure 31 preferably houses the surround view detector focal plane of the present invention. The optical filter/enclosure is preferably comprised of individual optical filters 32 disposed within a metal frame 33 having a base 34. The optical filters 32 are preferably adhesively bonded to the metal frame 33. The base 34 comprises means, such as apertures 35, for facilitating attachment thereof to a suitable mount surface. Each individual filter 32 may be substantially identical, or alternatively may comprise a filter substrate suitable for filtering different portions of the electromagnetic spectrum, so as to provide enhanced spectral data.

Figure 5:
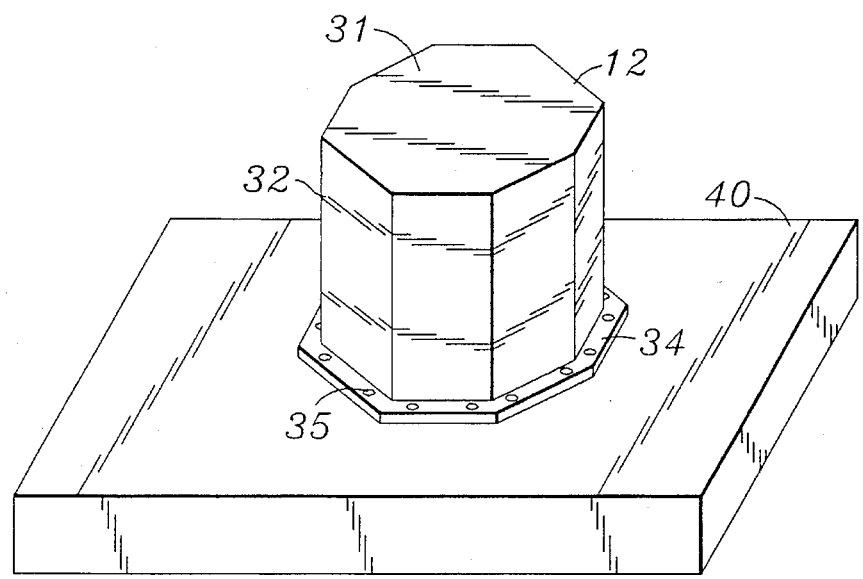
FIG. 5 is a perspective view of the assembled surround view detector focal plane of the present invention wherein the infrared detector module is disposed within the optical filter and enclosure assembly and the optical filter and enclosure assembly is mounted upon a support.

Referring now to FIG. 5, the optical filter/enclosure is mounted upon a support 40 which optionally contains signal conditioning electronics and/or an electronic interface unit. Cooling liquid, if desired, may also be contained within the support 40. The support 40 may additionally contain a mechanism for effecting rotation of the surround view detector focal plane, particularly for those applications wherein filters 32 for transmitting different portions of the electromagnetic spectrum are utilized. Thus, each differentially filtered focal plane is swept through 360° of view.

Thus, the infrared detector module of the present invention may be utilized in either stationary or mobile applications to provide surround or multi-view detection of various infrared sources, as desired. Those skilled in the art will recognize that the exemplary detector module of the present invention is suitable for use in various such applications.

It is understood that the exemplary infrared detector module described herein and shown in the drawings represents only a presently preferred embodiment of the invention. Indeed, various modifications and additions may be made to such embodiment without departing from the spirit and scope of the invention. For example, the shape and configuration of the infrared detector module may be varied, as desired. Indeed, the shape may be extended so as to provide imaging in substantially three dimensions by configuring the infrared detector arrays into a generally spherical configuration. Thus, such an infrared detector module could image upwardly, as well as in a substantially horizontal plane so as to detect projectiles coming in from a high altitude, for example. These, and other modifications and additions, may be obvious to those skilled in the art and may be implemented to adapt the present invention for use in a variety of different applications.

What is claimed is:

1. An infrared detector module, said detector module comprising:
   a) a plurality of infrared detector arrays configured to view in a corresponding plurality of different directions, each of said infrared detector arrays having a plurality of infrared detector elements formed thereon; and
   b) at least one conductive conduit supporting layer having a plurality of conductive conduits formed thereon, said conductive conduit supporting layers extending inwardly from each of said infrared detector arrays;
   c) wherein signals representative of outputs of the infrared detector elements are communicated from the infrared detector elements to signal processing circuitry via said conductive conduits.

2. The infrared detector module as recited in claim 1 wherein said infrared detector arrays are disposed in a generally circular configuration.

3. The infrared detector module as recited in claim 1 wherein said infrared detector arrays are disposed in a configuration selected from the group consisting of:
   a) octagonal;
   b) hexagonal;
   c) pentagonal;
   d) square; and
   3) triangular.

4. The infrared detector module as recited in claim 1 wherein said conductive conduit support layers extend from each of said infrared detector arrays generally toward the center thereof.

5. The infrared detector module as recited in claim 1 wherein said conductive conduit support layers extend generally perpendicularly from said infrared detector arrays.

6. The infrared detector module as recited in claim 1 wherein said detector arrays and said conductive conduit support layers define wedge-shaped modules.

7. The infrared detector module as recited in claim 6 further comprising an encapsulant material substantially covering the conductive conduit supports of said wedge-shaped modules.

8. The infrared detector module as recited in claim 1 further comprising a pipe extending therethrough for facilitating flow of a cooling fluid therethrough.

9. The infrared detector module as recited in claim 8 further comprising a multilayered flex-cable connector disposed about said pipe and having contact bumps formed thereon for facilitating electrical interconnection of said infrared detector array and signal conditioning electronics.

10. The infrared detector module as recited in claim 1 further comprising a housing, said housing comprising a plurality of filters.

11. The infrared detector module as recited in claim 10 wherein said filers filter different portions of the electromagnetic spectrum.

12. An multi-view infrared detector system, said system comprising:
   a) a plurality of infrared detector arrays disposed in a generally circular configuration, each of said infrared detector arrays having a plurality of infrared detector elements formed thereon, a core being defined intermediate said infrared detector arrays;
   b) a corresponding plurality of dedicated optics assemblies for forming images upon said infrared detector arrays;
   c) at least one conductive conduit support layer having conductive conduits formed thereon, said conductive conduit support layers extending inwardly from each of said infrared detector arrays;
   d) signal conditioning circuitry in electrical communication with said infrared detector elements;
   e) wherein signals representative of outputs of the infrared detector elements are communicated from the detector elements to the signal processing circuitry via said conductive conduits.

13. The multi-view infrared detector system as recited in claim 12 wherein said infrared detector arrays are disposed in a configuration selected from the group consisting of:
   a) octagonal;
   b) hexagonal;
   c) pentagonal;
   d) square; and
   3) triangular.

14. The multi-view infrared detector system as recited in claim 12 wherein said conductive conduit support layers extend from each of said infrared detector arrays generally toward the center thereof.

15. The multi-view infrared detector system recited in claim 12 wherein said conductive conduit support layers extend generally perpendicularly from said infrared detector arrays.

16. The multi-view infrared detector system as recited in claim 12 wherein said detector arrays and said conductive conduit support layers define wedge-shaped modules.

17. The multi-view infrared detector system as recited in claim 16 further comprising an encapsulant material substantially covering the conductive conduit supports of said wedge-shaped modules.

18. The multi-view infrared detector system as recited in claim 12 further comprising a pipe extending therethrough for facilitating flow of a cooling fluid therethrough.

19. The multi-view infrared detector system as recited in claim 18 further comprising a multilayered flex-cable connector disposed about said pipe and having contact bumps formed thereon for facilitating electrical interconnection of said infrared detector array and signal conditioning electronics.

20. The multi-view infrared detector system as recited in claim 12 further comprising a housing, said housing comprising a plurality of filters.

21. The multi-view infrared detector system as recited in claim 20 wherein said filers filter different portions of the electromagnetic spectrum.

* * * * *